(12) United States Patent
Cooke (10) Patent No.: US 6,685,034 B1
(45) Date of Patent: Feb. 3, 2004

(54) DEVICE FOR RETAINING ARTICLES

(76) Inventor: Michael Charles Cooke, 7 Beatrice Terrace, Ascot, QLD 4053 (AU)

(*) Notice: Subject to any disclaimer, the term of this patent is extended or adjusted under 35 U.S.C. 154(b) by 0 days.

(21) Appl. No.: 09/936,592

(22) PCT Filed: Mar. 14, 2000

(86) PCT No.: PCT/AU00/00186
§ 371 (c)(1),
(2), (4) Date: Sep. 14, 2001

(87) PCT Pub. No.: WO00/55858
PCT Pub. Date: Sep. 21, 2000

(30) Foreign Application Priority Data

Mar. 15, 1999 (AU) .............................. PP 9141
Nov. 26, 1999 (AU) .............................. PQ 4343

(51) Int. Cl.⁷ .............................................. A47G 29/00
(52) U.S. Cl. ...................... 211/40; 211/41.12; 211/69.1
(58) Field of Search ............... 211/40, 41.12, 211/60.1, 69.1, 69.5, 41.1, 70.6

(56) References Cited

U.S. PATENT DOCUMENTS

| 1,853,888 A | * | 4/1932 | Williams |
| 2,946,453 A | * | 7/1960 | Pityo |
| 4,595,098 A | * | 6/1986 | Kryter |
| 4,778,064 A | * | 10/1988 | Gold |
| 5,201,430 A | * | 4/1993 | Artzer ...................... 211/70.6 |
| 5,379,900 A | * | 1/1995 | Gregg et al. ........... 211/70.6 X |
| 5,584,391 A | * | 12/1996 | Weisburn ................. 211/40 X |
| 5,632,374 A | | 5/1997 | Fitzsimmons et al. ... 206/308.1 |
| 5,740,907 A | | 4/1998 | McCloy ..................... 206/307 |

FOREIGN PATENT DOCUMENTS

| DE | 19 807 863 | 8/1999 |
| GB | 2 306 443 | 5/1997 |
| JP | 08-034482 | 2/1996 |
| WO | WO 85/00274 | 1/1985 |

\* cited by examiner

Primary Examiner—Robert W. Gibson, Jr.
(74) Attorney, Agent, or Firm—Madson & Metcalf (57) ABSTRACT

A device for retaining articles including a support surface having a holding means which may be finger like projections and at least one holding zone defined by a space between adjacent holding means and whereby the adjacent holding means are adapted to hold an article in the holding zone.

34 Claims, 11 Drawing Sheets

DEVICE FOR RETAINING ARTICLES

FIELD OF THE INVENTION

The present invention relates to devices used for retaining different types of articles and products.

The present invention is particularly applicable to compact discs and other articles such as items of stationery such as rulers, pens and other items which are normally stored in an office environment but which are frequently being used.

The present invention also relates to audio and video compact discs or other software storage devices such as a computer CD ROM's, DVD's, Zip discs, floppy discs etc.

For convenience the present invention will be described in detail with reference to compact discs.

BACKGROUND OF THE INVENTION

A typical compact disc is used for storing computer software and music. Compact discs are typically stored in plastic cases or boxes. Such storage devices are normally themselves stored in either a drawer or a compact disc storage device such as a CD tower. The problem with the above arrangement is that each compact disc must be effectively stored twice. Firstly the compact disc must be stored in its case and secondly the case must then be stored away. Thus known storage devices and methods generally consists of an arrangement of small demarcated compartments in which the compact discs are stored within their cases. There are also other known storage devices which house only the compact discs without their corresponding cases. These later devices generally house the compact disc in thin sleeves of plastic sheeting material which are often fixed into a book like arrangements so that the individual sleeves form the pages of the book.

During normal use people who use compact discs may find that they need to shuffle between a multitude of discs at any one time.

For example computer users often need to access several different CD ROM discs throughout the course of their day. These discs are often left unprotected out of their cases where they are very likely to become damaged as a result of being scratched by other objects.

A further problem is that because of their physical characteristics, compact discs have a tendency to rest on either of their two flat surfaces and as a result when left out of their protective cases they can be easily damaged. This can occur when one of the two flat surfaces comes into direct contact with a work surface such as a desk top. Alternatively the upward facing surface may easily be damaged when other objects are placed upon it.

The present invention is aimed at providing a storage device which at least alleviates some of the aforementioned problems.

SUMMARY OF THE INVENTION

According to the present invention there is provided a device for retaining articles including a support surface having a holding means and at least one holding zone defined by a space between adjacent holding means and wherein the device is able to be placed in a plurality of orientations in which the adjacent holding means are adapted to hold at least one article in the holding zone.

Preferably the holding means comprise holding portions which extend from the support surface.

Preferably each holding means comprises at least one holding member.

It is preferred that the holding means is adapted to immobilise articles in a plurality of orientations.

Preferably the holding means is adapted to hold at least one article in an orientation in which gravity applies a force to remove the article from the holding zone.

According to one embodiment the holding means is adapted to hold at least one article above a ground surface.

According to another embodiment the holding portions are adapted to extend horizontally.

It is preferable that the holding members are adapted to hold an article whereby it is immobilised against the force of gravity or to a predetermined level against other forces acting on the device in use.

According to another embodiment the device may be adapted to be connected to the underside of a surface, whereby the holding members extend downwardly from the supporting surface.

It is also possible for the device to be connected to an irregular shaped surface whereby some holding members extend at different angles to other holding members.

According to another embodiment a plurality of holding members are arranged in predetermined geometrical groups or configurations or unordered configurations.

The holding means is preferably adapted to hold a plurality of articles.

Desirably the holding means is adapted to immobilise articles in the holding zone.

The device may comprise a plurality of holding members aligned in a plurality of rows.

One holding zone may be defined by a space occurring between adjacent rows of holding members. The holding members preferably include holding portions whereby an article is able to be held between holding portions of adjacent holding members.

Each holding member may have at least one holding portion.

Preferably each holding member has a plurality of holding portions.

Each holding portion may be resiliently deformable.

It is preferred that each holding portion comprises a peripheral side wall portion of one holding member.

Each holding member preferably comprises a projection upstanding from the support surface.

The support surface may comprise a base.

The support surface preferably comprises a generally planar base.

The support surface may be resiliently deformable.

According to another aspect of the present invention there is provided a device for holding articles comprising a support surface having a holding means thereon, the holding means having holding parts defining a holding zone adapted to receive an article whereby the article can be held by adjacent holding parts of the holding means.

Each holding member may comprise a resiliently flexible projection extending from the base.

Preferably each holding member extends at substantially 90° upwardly from the base depending on its orientation.

Each holding portion preferably comprises at least one fin extending from a side wall of the holding member with which it is associated.

Preferably each holding portion comprises a web extending laterally from its holding member.

Each fin may extend from a top end of its holding member to a bottom end thereof.

Each fin may increase in lateral width from the top end to the bottom end.

Preferably the device comprises four fins equispaced around the periphery of each holding member.

Each holding member may comprise a cylindrical projection.

The support surface may comprise a lattice portion comprising rows and columns of holes.

It is preferred that a row of holes is aligned with a holding zone.

The rows and columns of holes may be included in rows and columns of base portions.

Each holding member may be located over one of the rows or columns of the base portions.

Each holding member may be located at a junction between rows and columns of the base portions.

Preferably holding members are arranged at respective junctions in rows and columns.

It is preferred that holding portions of the holding members extend laterally across part of an adjacent hole.

Flexing of one holding member preferably results in one fin of the holding member moving downwardly whereby its lower end is able to enter an adjacent hole.

It is preferred that each holding portion extends over a respective one of the holes.

Preferably at least some of the fins are curved downwardly.

According to one embodiment the fins have a convex outer surface.

According to another embodiment the holding members comprise parallel rows of ribs.

It is preferred that the fins comprise gripping means for gripping an article between adjacent fins.

Preferably the gripping means includes a peripheral portion of the fin.

The gripping means may be configured to enhance gripping for example by having articulated edge portions.

Alternatively the gripping means may be finger-like projections such as barbs or other retaining means which extend inwardly from an outer surface of the fin.

According to an alternative embodiment the finger-like projections extend outwardly.

According to another embodiment each holding portion comprises gripping means for gripping an article placed between at least two opposing holding members.

The gripping means may be a plurality of filaments.

Each filament may have barbs or other retaining portions located along their surfaces.

The fins may be made of a flexible material such as plastics and rubber.

Preferably the holding means includes a non-scratching means, which according to one embodiment may be a coating of a non-scratching compound.

It is preferred that the non-scratching means provides sufficient frictional force to ensure an article is held by the holding means in normal use.

The base may have an adhesive backing according to one embodiment.

The base portion preferably comprises thin strips of resilient material.

The holding portions may be in the form of thin strips of resilient material.

According to another embodiment the holding portions may be resiliently flexible.

According to an alternative embodiment the holding means includes holding members, a base and support comprising a plurality of apertures adapted to have respective holding members extend therethrough, when placed on the base support.

It is preferred that the holding means comprises a base sleeve having a plurality of collar portions each located around a respective aperture and having holding portions for holding an article between adjacent holding portions.

The holding portions preferably include fins located around the periphery.

Each holding member may have a cross section which is a geometrical shape such as round, square or triangular.

Each holding member may be in the form of a projection.

Each projection may have a hollow interior.

It is preferred that the lower end of each projection has a hollow interior.

The lower end may comprise a plurality of webs which connect the projection to the support surface.

Each projection may comprise fins joined together by linking means.

Preferably each holding means comprises an upwardly extending wall.

According to one embodiment the walls consist of walls of a slot or groove.

The slot may be the holding zone.

According to one embodiment the holding means comprises rubber finger like columns.

The support surface may be generally curved with a holding region including the holding means.

The support surface may have a generally convex shape.

The support surface preferably includes slots of different length.

It is preferred that the holding members reduce in cross-sectional width from bottom to top.

The holding members may be angled towards an adjacent holding member in an opposite row of holding members defining an opposite side of the holding zone.

According to one embodiment the device comprises a random pattern of holding members.

According to an alternative embodiment the holding means comprises soft deformable plastic material which is adapted to be deformed to create a holding zone.

The holding members may be of different lengths.

The holding members preferably comprise semicircular walls.

The walls preferably are closer together at a bottom end thereof.

According to another embodiment the walls increase in thickness from the top to the bottom end.

The device may be flexible so as to be affixable to the surface of another object.

The object may be curved or may be a fixed structure or irregular in shape.

According to another embodiment of the present invention the holding members comprise projections having bulbous portions at top ends thereof.

At least some of the projections are provided with intermediate gripping means for gripping an article placed between adjacent projections.

At least some of the holding members may be irregular in shape.

According to a preferred embodiment each projection has a generally cylindrical cross section.

According to another embodiment at least some of the projections are upwardly extending members which gradually diverge from an opposite adjacent holding member.

According to another embodiment each holding member comprises a plurality of peripheral webs.

Each web may have varying widths along the length of the holding member.

It is preferred that each of the holding members comprises a plurality of webs facing webs of another holding member on an opposite side of the holding zone.

Preferably the support surface comprises a generally planar body.

The support surface may be in the form of a base having a bottom surface and an upper surface from which the holding members extend.

The support surface may be a flexible body.

The supporting surface may be an article.

BRIEF DESCRIPTION OF THE DRAWINGS

A preferred embodiment of the present invention will now be described by way of example only with reference to the accompanying drawings in which:

FIG. 18b shows a front view of the storage device shown in FIG. 18a;

DETAILED DESCRIPTION OF THE DRAWINGS

Figure 1:
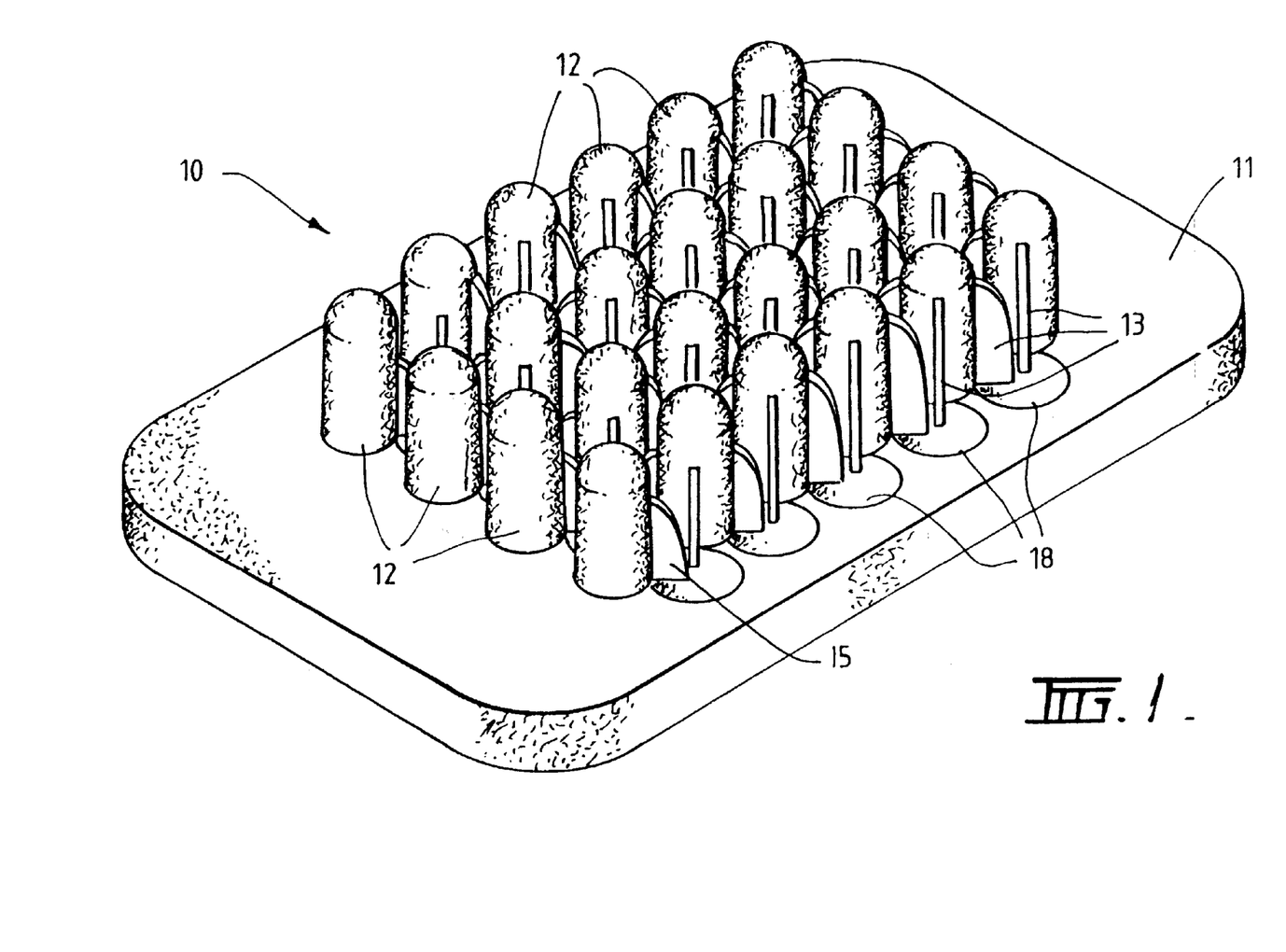
FIG. 1 shows a top angled view of a storage device for CD's in accordance with a first embodiment of the present invention.

According to the first embodiment of the present invention the storage device 10 is specifically designed to hold compact discs. The storage device 10 in this embodiment thus consists of a generally planar base 11 having an array of upstanding finger like spigots 12.

As shown in FIGS. 1 to 4 the spigots 12 are effectively cylindrical columns having four lateral fins 13 equispaced around the periphery of the spigot 12.

The fins 13 curve outwardly and downwardly from the top part of each spigot and terminate at a bottom part of the spigot with an end wall section which is effectively perpendicular to the peripheral surface of the spigot 12.

According to this embodiment the fins 13 may commence near the top of the spigot 12 as shown by fin 14 or alternatively may begin further down the spigot 12 as shown with fin 15.

The spigots 12 are arranged in an array of rows and columns 16, 17. Between the lattice of rows and columns 16, 17 circular holes 18 are provided. The holes 18 have a larger diameter than the diameter of the spigots 12 and have a radius which is slightly larger than the radial width of the bottom of each of the fins 13.

Figure 2:
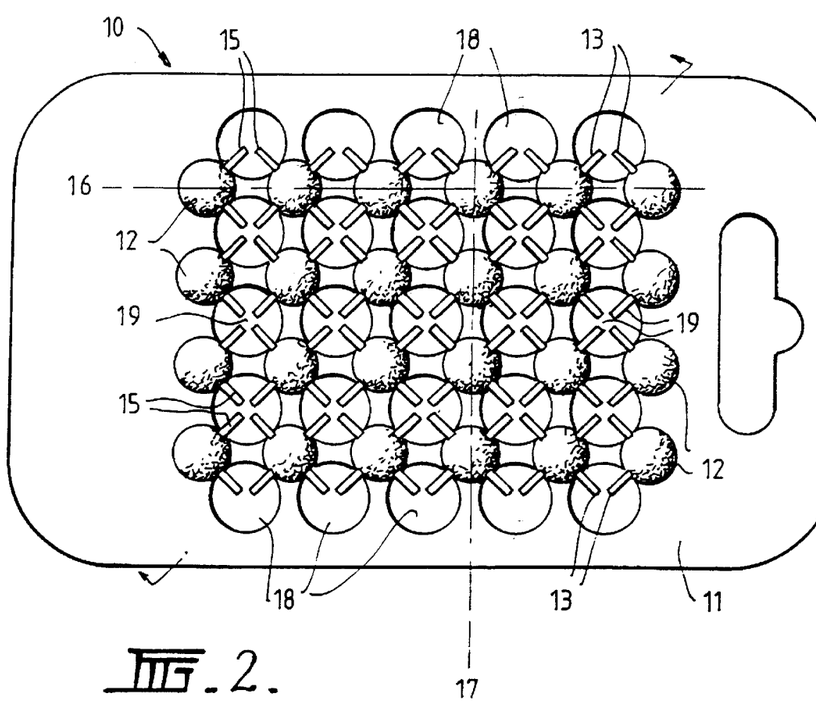
FIG. 2 shows a top view of the storage device shown in FIG. 1.
Figure 3:
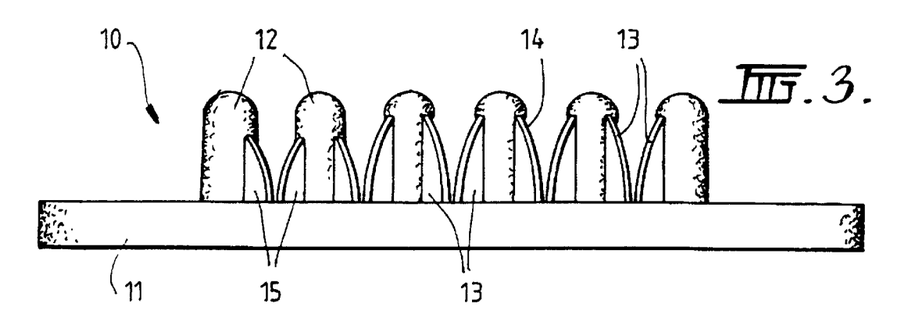
FIG. 3 shows a side view of the storage device shown in FIG. 1.

Because of the arrangement of columns and rows of spigots, the fins 13 extend over a respective one of the holes 18. Because a hole 18 is surrounded by four spigots 12, as shown in FIG. 2, four fins 19 extend over each of the holes 18.

Each of the fins 19 terminate before the center of each hole 18 and together form a cross configuration over each hole 18.

Figure 4:
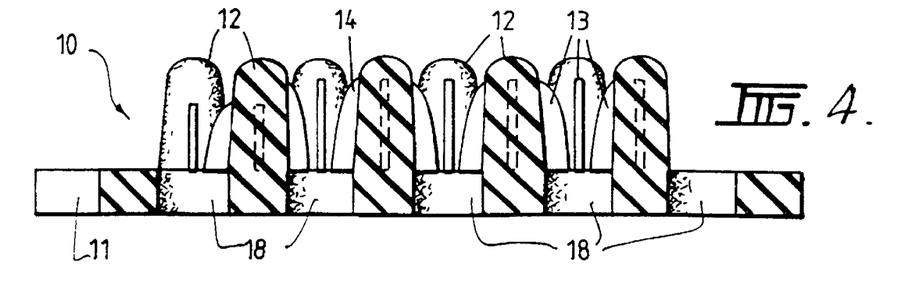
FIG. 4 shows a cross sectional side view of the storage device shown in FIG. 1.

As shown in FIG. 4 the bottom of each of the fins 13, 19 are substantially flush with the level of the bottom of each spigot 12.

The holes 18 preferably have the advantage of providing increased flexibility for the fins 13, 19, because their lower surfaces are disconnected from the base 11.

Thus it is preferred that the bottom surface of the fins is able to move freely with respect to the adjacent lower surface if this is the base 11.

It is possible that the bottom surface of the fins do not face the base surface. For example the spigots could be angled whereby the bottom of the fins face the bottom of opposing fins.

Alternatively the fins may be of shorter length so that their lowermost surface/edge is well above the base 11

It should be noted that in this embodiment the rows and columns 16, 17 are characterised by a central portion of the base 11 having a lattice structure with the spigots located at the center of intersecting rows and columns of the lattice structure.

To protect the fins 12 the lattice structure of the base 11 may be slightly recessed with respect to the rest of the base so that the bottom of each of the fins 13 are located below the perimeter of the base 11.

It is preferred that each of the spigots 12 are flexible along with the fins 13.

Each of the rows and columns of spigots 12 define what is in effect a holding zone between adjacent rows and columns of spigots 12. The distance between adjacent spigots must be sufficient to hold a compact disc without the compact disc dropping out of this holding zone.

In its preferred form the base 11 is able to be connected or adhered to any surface in any configuration and a CD is able to be held in the holding zone without dropping out of the holding zone even if the base is oriented so that the spigots 12 are downwardly directed or horizontally directed.

In this respect the fins 13 act to help retain a compact disc within the holding zone.

When a CD is pressed between rows or columns of spigots 12, adjacent spigots effectively move apart but the resilience of the spigots 12 provides a frictional engagement with opposite surfaces of the compact disc. Alternatively the spigots could be inflexible or rigid. The fins provide the majority of gripping to retain the compact disc within the holding zone.

According to one embodiment the spigots are configured or made of sufficient rigidity to counteract any moment or rotational forces which are applied to the spigots to withdraw an article which is held between opposing spigots when the device is used in a typical application.

In one example the device may be used in a car. When the car moves forces will be applied to any article held by the device. Such forces will include rotational forces. In such a situation there are benefits in providing spigots of the preferred embodiment with sufficient rigidity to counteract moments of force or rotational forces.

In another example if the device is placed on a vertical surface and a CD is placed on the device in a diagonal orientation, rotational forces will be applied to spigots holding the CD. In such a situation it is preferable that the spigots are rigid to counteract these rotational forces.

According to another embodiment the spigots may have a corkscrew configuration.

The fins may be more pliable and resilient than the columns of the spigots 12 and may have a wafer like thickness which adds to the frictional engagement with opposing planar surfaces of the compact disc which is located in the holding zone.

The length, shape, geometry and material of each of the fins 13 can be varied to increase or decrease the amount of frictional engagement and therefore gripping which is applied to a compact disc or any other article which is to be located between rows and columns of the spigots 12.

Preferably the device is made from a single material such as Santoprene (trade name).

Furthermore the size, shape and geometry, resilience and flexibility of the spigots 12 may be varied in order to suit different types of articles and in order to vary the tightness with which an article is held in respective holding zones.

The spacing between adjacent rows and columns of spigots 12 may also be varied so that some of the rows/columns may be adapted to receive one particular article and other rows and columns are able to receive and store a different type of article.

Additional variations include providing different shaped spigots for some rows/columns, again so that different types of articles can be held in different regions of the holding device.

Although the preferred embodiment discloses spigots having four fins it is equally possible to have a multiplicity of fins located around the periphery of each spigot. The fins may also be replaced by equivalent gripping or retaining portions which extend from the surface of each spigot in order to assist with retaining an article such as a CD within a holding zone between adjacent spigots.

In addition the spigots may be replaced by protrusions or other extensions of different geometrical configurations depending upon the type of article which is to be retained by the holding device.

According to one embodiment each spigot could have peripheral extensions in the form of filaments to provide a cross-sectional appearance of a snow flake.

According to another embodiment each spigot could have peripheral extensions in the form of petals of a flower. For example the device could have the appearance of a water lily flower with CD's being insertable between the petals of the water lily.

According to another embodiment the spigots may have rib-like protrusions which extend horizontally and upwardly.

It is preferred that the bottom of the base 11 is provided with a means for fixing or adhering the holding device 10 to another surface. Such a fixing means may include a peel off adhesive strip, a magnetic strip or holes which are adapted to receive fixing devices such as screws.

It is also possible to adapt existing structures such as computer hardware so that they have areas which are specifically adapted to receive the base of the holding device 10.

Other embodiments of the invention will now be described with reference to the remaining figures.

FIGS. 5 to 9 show a holding device 20 which has matchstick like spigots 21 each with a rounded head 22 at a top end thereof.

Figures 5, 6, 7:
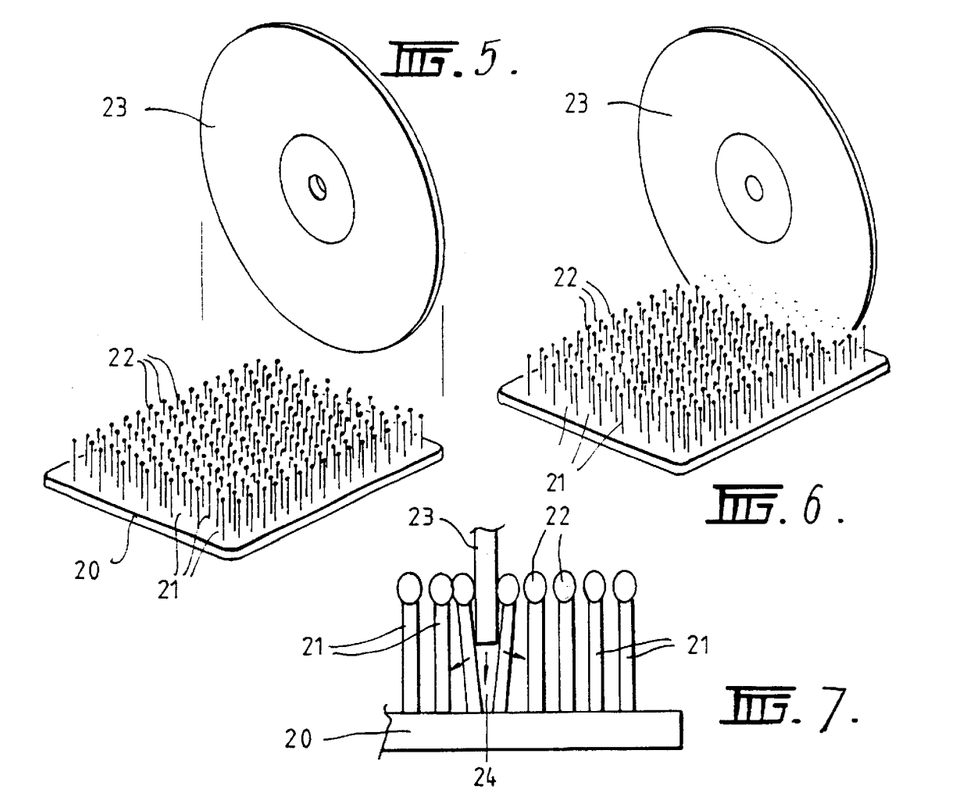
FIG. 5 shows an angled side view of a storage device according to a second embodiment of the present invention.
FIG. 6 shows the storage device according to the second embodiment incorporating a CD.
FIG. 7 shows an expanded side view of the storage device shown in FIG. 6.

As shown in FIG. 7 a compact disc 23 is able to be pushed between rows of adjacent spigots 21 and their integrally formed heads 22.

The spigots 21 spread apart as the compact disc 23 is pushed lower and therefore deeper into the holding zone 24 located between adjacent spigots 21 and therefore affords the person using the holding device the ability to have the compact disc held more tightly in the holding zone.

Figure 8:
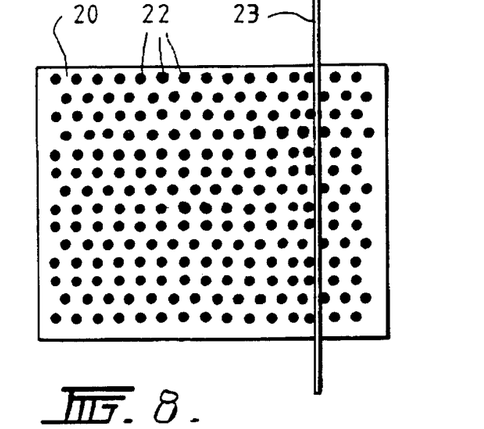
FIG. 8 shows a top view of the storage device shown in FIG. 6.
Figure 9:
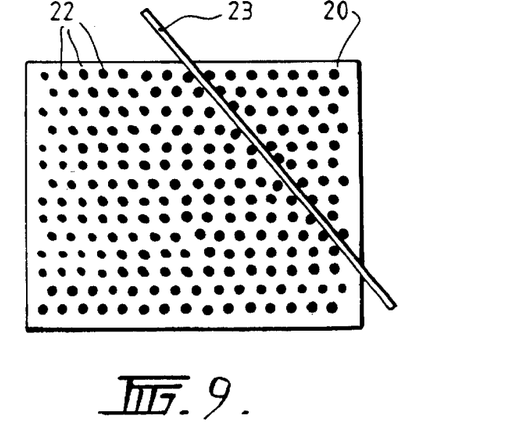
FIG. 9 shows a top view of the storage device according to the second embodiment when storing a CD in accordance with a second option.

FIG. 6 shows how the compact disc 23 is able to sit in the holding device 20 and FIGS. 8 and 9 show two different ways in which the compact disc 23 can be held by the spigots 21.

It is noted that there is in effect a random arrangement of spigots 21 for the holding device 20. However because the spigots 21 are reasonably close together and are also very flexible and resilient, the compact disc 23 can e held at any angle and accordingly a holding zone 24 can be effectively created by pressing the CD 23 into spaces between adjacent spigots 21.

Thus different holding devices are contemplated which have spigots extending from a surface of any orientation. For example the spigots may extend outwardly and horizontally from a vertical surface or outwardly and downwardly from an overhanging surface. The holding device may be of any particular shape as long as it includes spigots on its external surface or internal surface in a manner which allow an article to be held between spigots.

It can be seen from the above that the holding device serves to defy gravity by holding a CD from the side of a computer monitor or any other electrical device or piece of furniture. For example the holding device may be adhered to the underside of a desk or may be integrally formed in the form of a mat which can be slotted into a receiving zone of another surface.

Figures 10, 11, 12, 13, 14, 15:
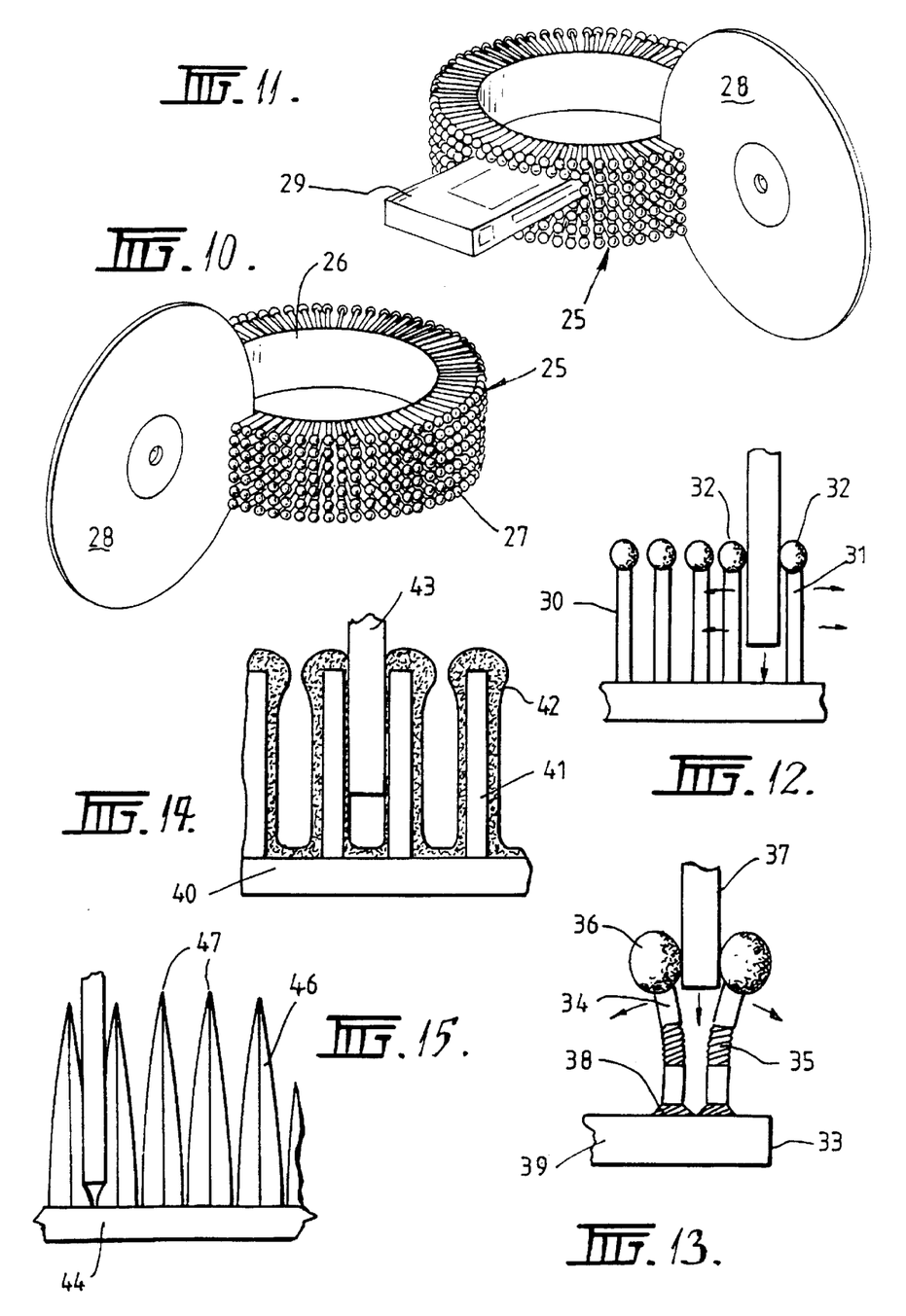
FIG. 10 shows an angled front view of a storage device according to a third embodiment of the present invention.
FIG. 11 shows the storage device according to the third embodiment when storing multiple articles.
FIG. 12 shows a side view of the surface of the storage device according to the third embodiment.
FIG. 13 shows a side view of a storage device according to a fourth embodiment of the present invention.
FIG. 14 shows a side view of a storage device according to a fifth embodiment of the present invention.
FIG. 15 shows a side view of a storage device according to a sixth embodiment of the present invention.

FIGS. 10 and 11 show a holding device 25 in which the base 26 is formed in a cylindrical shape and the spigots 27 are arranged around the periphery of the so created cylinder 26.

Although the embodiment of FIGS. 10 and 11 shows spigots similar to those shown in FIGS. 5 to 9, the shape of the spigots may be varied in accordance with any of the embodiments described herein.

As shown in FIG. 11 the holding device 25 may be adapted to hold compact discs 28 and a cassette tape 29. Equally the storage device 25 could also be adapted to hold floppy discs or other storage devices as well as items of stationery such as rulers and pens.

In each of the above examples it should be noted that the type of spigots may need to be changed to suit the particular article which is to be stored. Accordingly regions of the storage device 25 may have patterns of different types of spigots.

FIG. 12 shows a further embodiment of the present invention in which the spigots 31 are more rigid and the heads 32 provide gripping to hold an article between adjacent rows of spigots 31.

As shown in FIG. 13 a storage device 33 may be provided with spigots 34 having knee sections 35 which are flexible. Each of the spigots 34 may have heads are reasonably large and have specially contoured external surfaces to increase the surface area for frictional engagement with a compact disc 37 located therebetween. The knee sections 35 may be complimented by flexible joints 38 by which each spigot 34 is connected to base 39 of the storage device 33.

As shown in FIG. 14 a storage device 40 may be formed with spigots 41 which are reasonably rigid. A coating 42 of flexible material is formed over each of the spigots 41 and this coating 42 provides frictional engagement with an article 43 in order to retain it between adjacent rows/columns of spigots 41.

The coating could be replaced by a gel or equivalent.

FIG. 15 shows an alternative embodiment of the invention in which storage device 44 has spigots 45, which are effectively columnless fin structures 46.

Each spigot 46 may comprise two, three of more fins which terminate at their upper end in a point 47.

Figure 16:
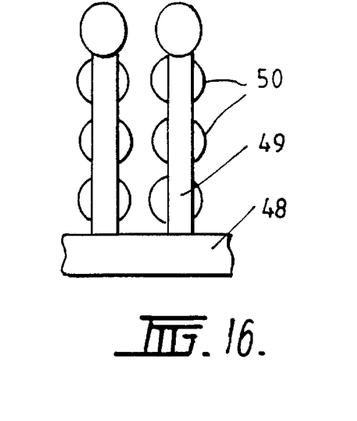
FIG. 16 shows a side view of a storage device according to a seventh embodiment of the present invention.
Figure 17:
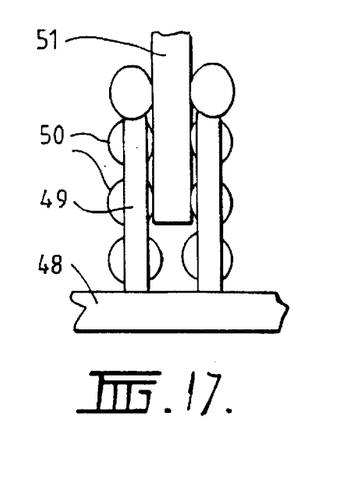
FIG. 17 shows the storage device shown in FIG. 16 storing an article.

In FIGS. 16 and 17 a storage device 48 is shown having spigots 49 with a series of rounded lateral balls or bulbous regions of flexible material. A CD 51 is adapted to be inserted between adjacent spigots 49 and frictional engagement occurs by way of the bulbous regions 50.

According to a variation on the storage device 48 each of the bulbous regions may be able to act independently of another and will be compressed by the inserted CD 51. The different bulbous portions 50 could also be made of materials of different compressibility so that the regions closest to the base would be least compressible and the regions closest to the upper end of the spigots 49 would be most compressible.

This arrangement would allow the user to control the degree of firmness by which an inserted object was held. For example, by inserting the CD 51 only a small distance into the device only the most compressible regions would be compressed and the subsequently lateral opposing forces on the CD 51 would be relatively small when compared to an object that was inserted a larger distance into the device, thereby causing compression of the less compressible regions and the subsequently laterally opposing forces on the inserted object would be relatively large.

Figure 18A:
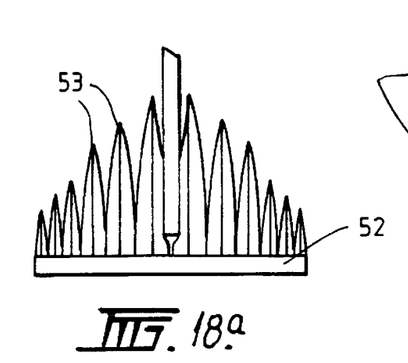
FIG. 18a shows a side view of a storage device according to a seventh embodiment of the present invention.
Figure 18B:
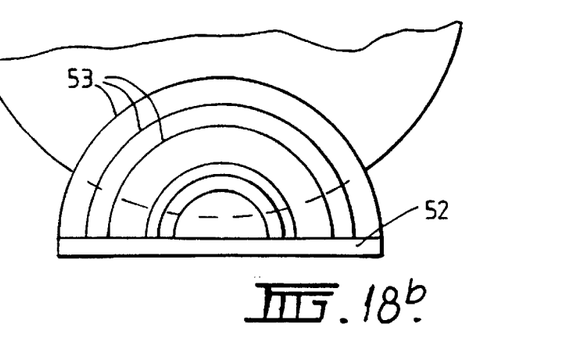

FIGS. 18a and 18b show a storage device 52 having rows of thin walls 53, instead of spigots. The height and length of each wall 53 varies, with the tallest and longest ones being located in the center of the storage device 52.

The angle or orientation of each wall 53 could also vary from one part of the storage device 52 to another.

Figures 18C, 18D:
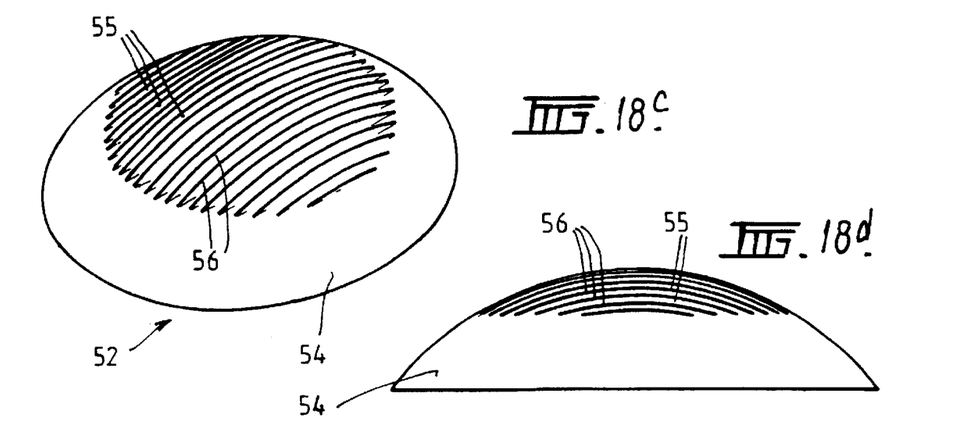
FIG. 18c shows a top angled view of a storage device according to an eighth embodiment of the present invention.
FIG. 18d shows a side view of the storage device shown in FIG. 18c.

FIGS. 18c and 18d show a variation on the storage device 52, in which storage device 54 is in the form of a part hemispherical base structure with a series of grooves 55 and associated walls 56, acting as the holding zones and spigots. Each of the walls 56 are made of a flexible material and may have additional surface structures in order to enhance the ability of the storage device 54 to hold and support an article within each of the grooves 55.

Figure 19:
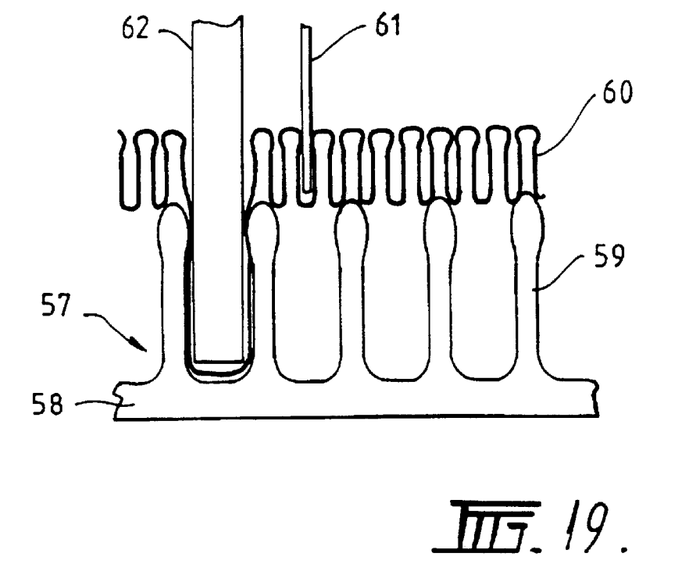
FIG. 19 shows a side view of a storage device according to a ninth embodiment of the present invention.
Figure 20:
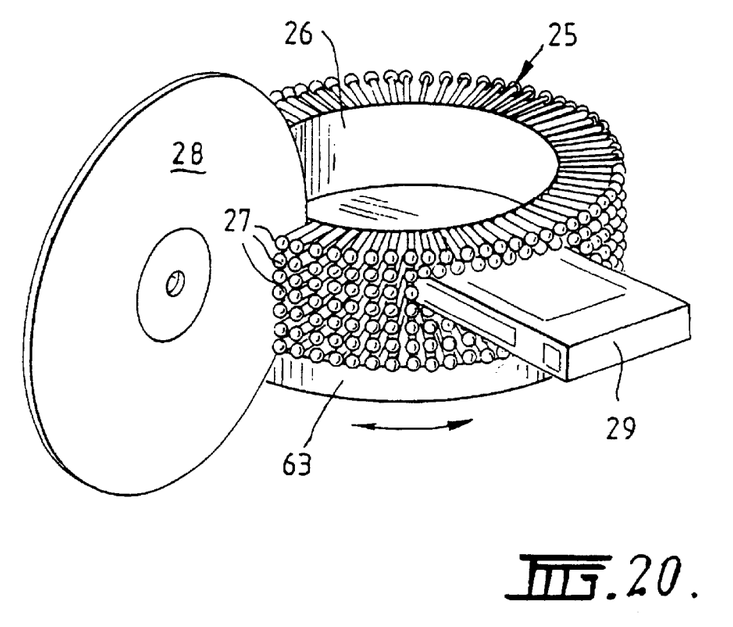
FIG. 20 shows an angled side view of a storage device according to a tenth embodiment of the present invention.

According to another embodiment of the present invention a storage device 57 is provided as shown in FIGS. 19 and 20.

The storage device 57 consists of a base 58 having spigots 59 and cover spigots 60 which fit over the end of the spigots 59 and are constructed of a relatively more deformable and/or flexible material. The less deformable spigots 59 could be partially or wholly covered by the more deformable region of spigots 60.

When a relatively thin object 61 is inserted into the storage device 57 it is able to be held sufficiently by the more deformable region 60.

However when a relatively heavier and/or thicker object is inserted such a compact disc case, it is able to be pushed into the less deformable region with spigots 59 so that the more deformable region 60 will deform to whatever shape is necessary to allow the object to sit firmly between opposing protruding members of the relatively less deformable region.

FIG. 20 shows a variation on FIG. 11 in which the storage device 25 has a rotatable base 63.

Figure 21:
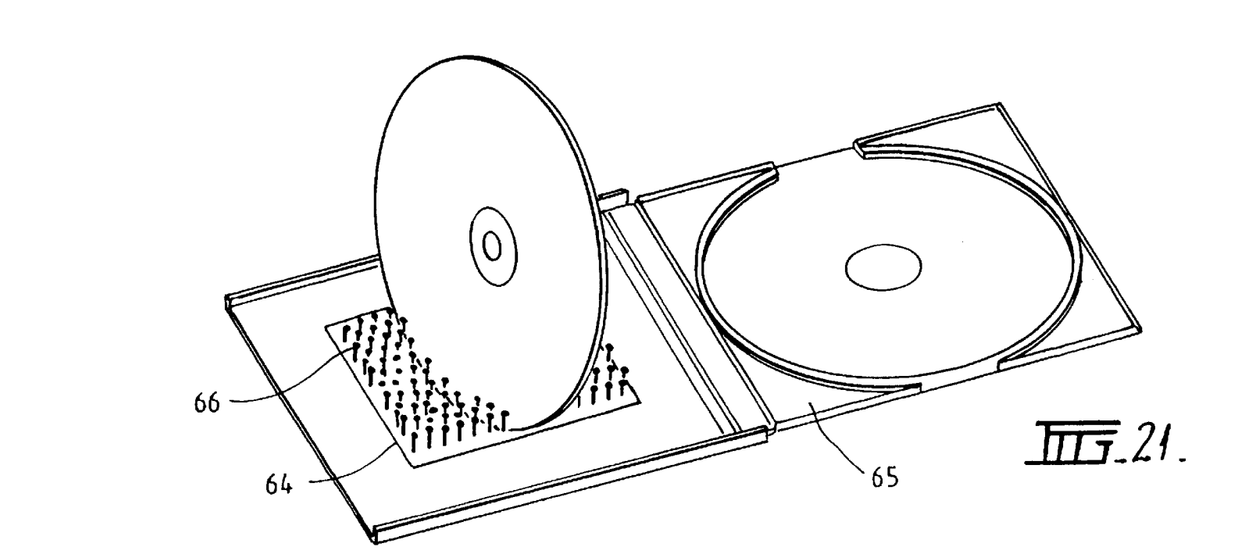
FIG. 21 shows an angled top view of a storage device according to an eleventh embodiment of the present invention.

FIG. 21 shows a storage device 64 which could be any of the storage devices described herein but which is incorporated in a CD case 65. In this embodiment the base 66 of the storage device 64 could be very thin and contain an adhesive coating on its bottom surface to allow it to stick to the inner face of the CD case 65.

Figure 22:
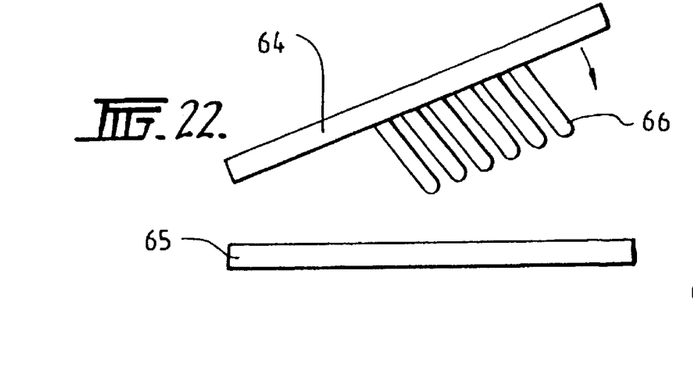
FIG. 22 shows a conceptualised side view of the storage device shown in FIG. 21 when in a partially open position.
Figure 23:
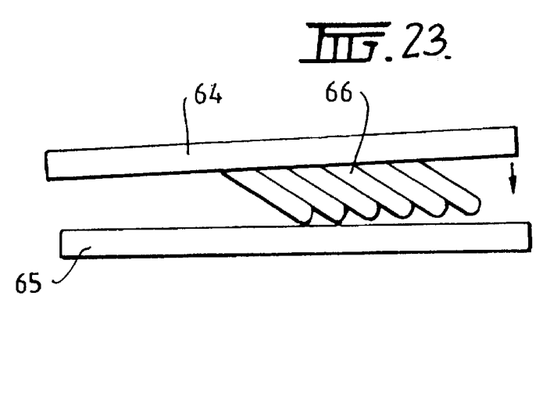
FIG. 23 shows the storage device shown in FIG. 21 when in an almost closed position.

In this embodiment spigots 67 of the storage device 64 could be designed to be collapsible. This allows the case 65 to close. FIGS. 22 and 23 illustrate how spigots 66 would be able to collapse as the CD casing 65 closes.

Figure 24:
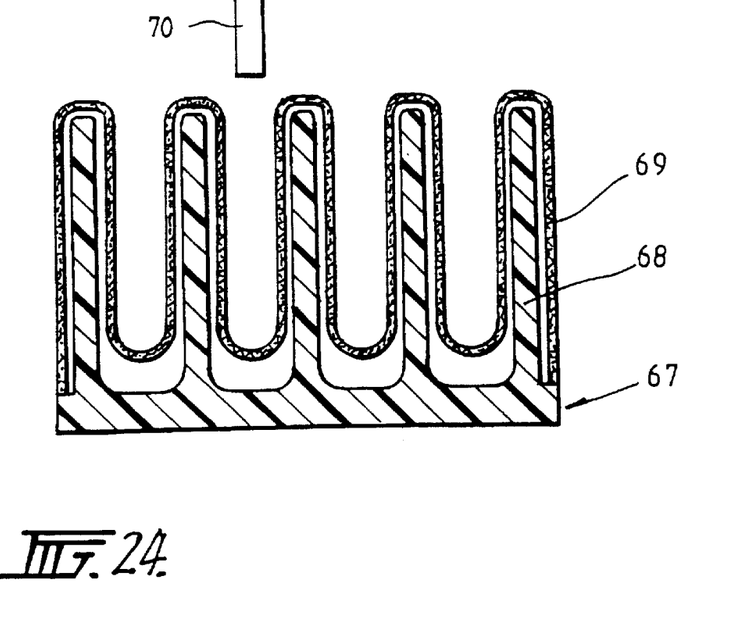
FIG. 24 shows a side view of a storage device according to a twelfth embodiment of the present invention.
Figure 25:
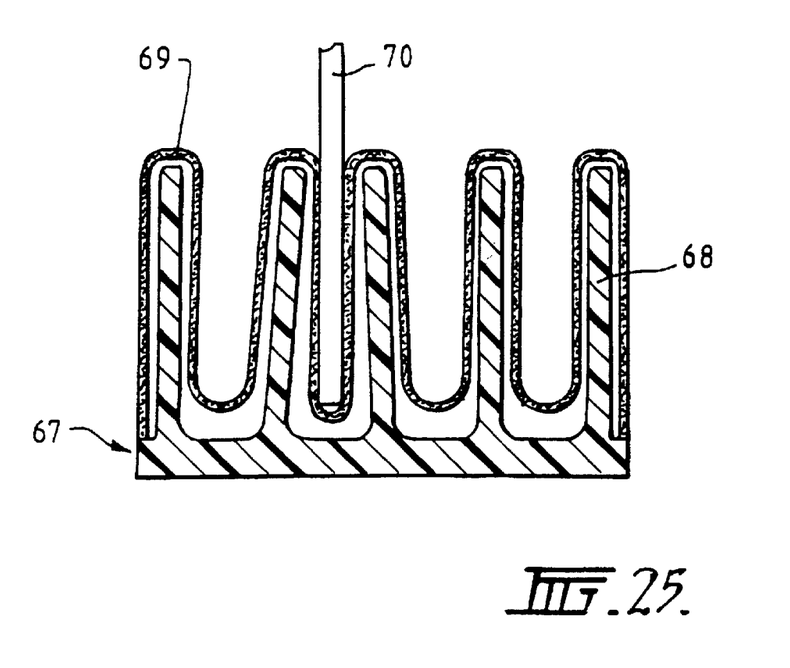
FIG. 25 shows the storage device shown in FIG. 24 with a CD stored therein.

FIGS. 24 and 25 illustrate storage device 67 with spigots 68 which are made from a deformable material that once deformed would maintain their new shape and not return to the previous shape unaided. This would allow the spigots 68 to effectively pinch an article inserted therebetween once the flexible material 69 coated over the spigots 68 had pulled them inwards and created a laterally opposing force on the article 70. Thus the layer of flexible material has tensile forces which in turn causes the spigots 68 to bend inwardly and grasp an inserted object.

Figure 26:
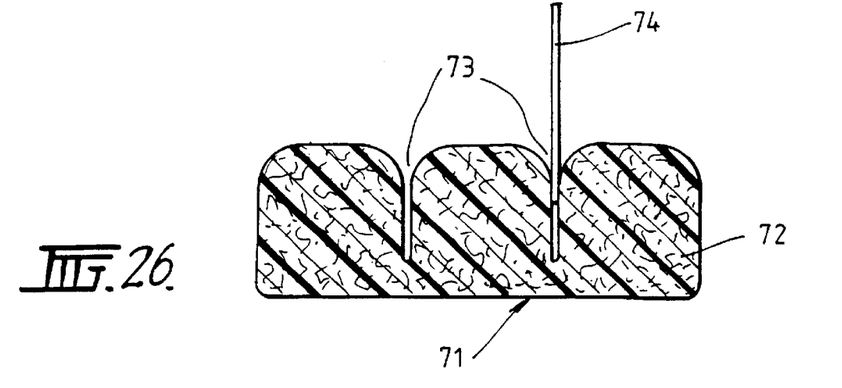
FIG. 26 shows a side view of a storage device according to a thirteenth embodiment of the present invention.
Figure 27:
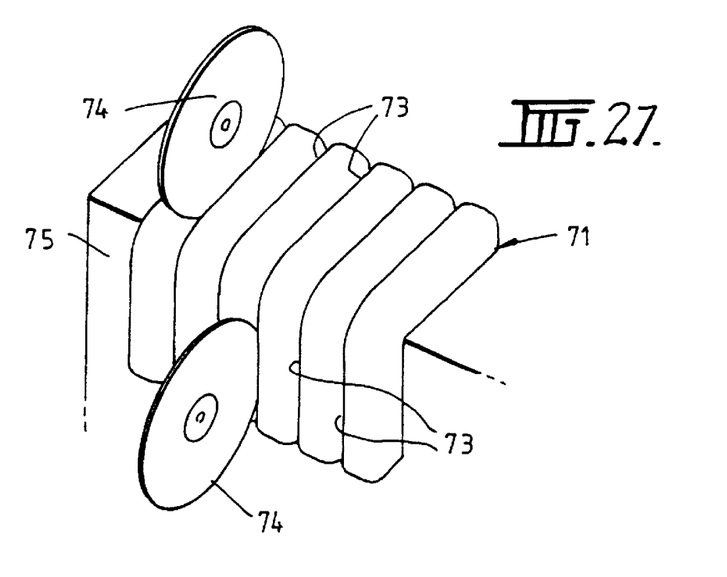
FIG. 27 shows the storage device shown in FIG. 26 when adhered to an angled surface.
Figure 28:
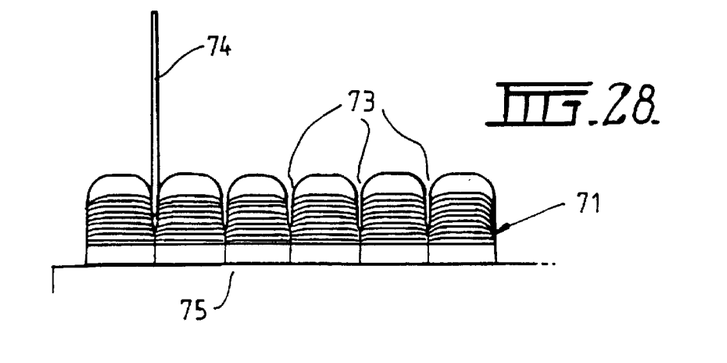
FIG. 28 shows a side view of the storage device shown in FIG. 27.

FIGS. 26 to 28 show another embodiment of the invention in which a storage device 71 is made from a thick layer of soft pliable material 72 with a series of parallel slots 73 which are adapted to receive a thin object such as a CD 74. According to a variation on this concept the storage device 71 could be made of a flexible material having such flexibility as to allow slots to be created as desired by simply pressing an object into the upper surface of the storage device 71.

According to another embodiment of the present invention the holding device consists of an array of sliding or depressible columns which may be made from a material such as a sponge like material.

In such an embodiment the objective is to simulate the concept of providing a holding zone between adjacent holding portions. Thus if a CD pushes down on a series of adjacent sliding columns, as the columns slide down under the pressure applied by the CD, other columns remain unmoved and the sides of these unmoved columns provide a frictional engagement with the planar surfaces of the CD. As long as the frictional forces provided by these unmoved columns is sufficient to overcome the resilient upward force applied by the depressed sliding columns the CD will be held firmly between columns on either side of the depressed columns.

According to the above embodiment the holding device can be in the form of a large sponge-like material which has an array of vertical cuts placed in it from its top surface. This array of cuts forms the columns which are individually able to be depressed but are resilient so as to move up again once the force of depression has been removed.

If the sliding columns are sufficiently small in effect they act like numerous spigots which are extremely close to each other, as they are only separated by the vertical cut which exists between them.

According to another variation of this concept each sliding or depressible column can be provided with side surfaces which have filaments, webbing or other structures which assist in providing a frictional engagement of the surface of an article with which they abut.

The grid of columns described above may be of a regular geometrical shape or an irregular shape. Thus the columns may have a rectangular cross-section or may have a circular or curved cross-section.

According to another embodiment the array of cuts may be serpentine or wave-like in appearance. The slidable/depressible columns may have different shapes.

As shown in FIGS. 27 and 28 the storage device 71 may be adapted to be connected to angled surfaces 75.

Figure 29:
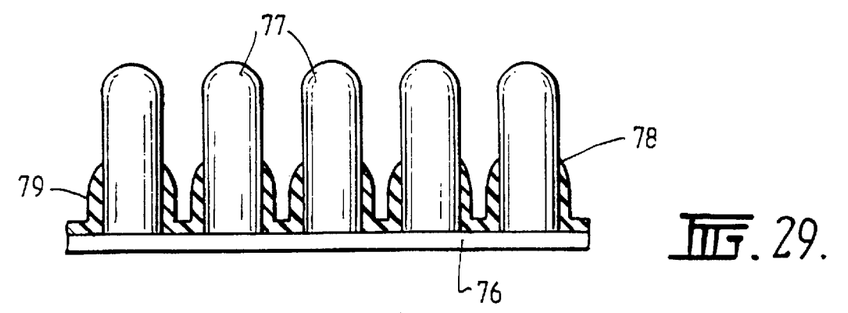
FIG. 29 shows a side view of a storage device according to a fourteenth embodiment of the present invention.

FIG. 29 shows a storage device 76 consisting of rounded column shaped spigots 77 and a mat of flexible material 78 which is formed with an array of holes which enable the mat to be placed over the spigots 77. Each of the holes of the mat 78 are provided with upwardly extending bosses which act as sleeve sections for the spigots 77 and are made of a soft pliable material which is adapted to provide a frictional engagement with an object inserted between rows of spigots 77.

The shape of the mat and its bosses may vary and the bosses may be in form of fins which slip over each of the spigots 77.

Figure 30:
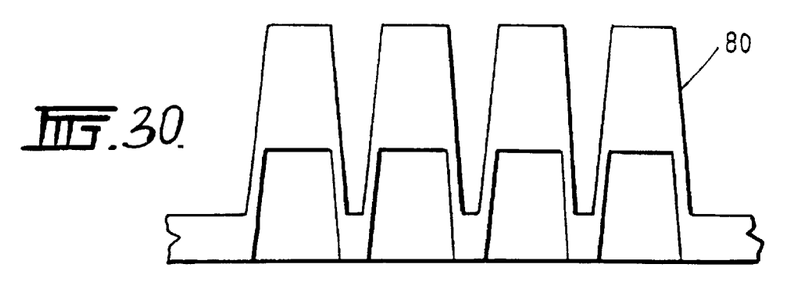
FIG. 30 shows a side view of a storage device according to a fifteenth embodiment of the present invention.
Figure 31:
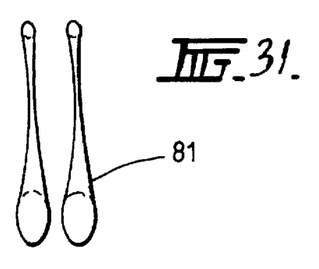
FIGS. 31 to 37 show side views of alternative types of storage devices according to the present invention.

FIGS. 30 to 37 show different shaped spigots in accordance with different embodiments of the present invention. Thus FIG. 30 shows spigots which have a generally frusto conical shape, FIG. 31 shows spigots 81 which have a lower bulbous region which extends into a thin curved finger like projection with a small nodule on its upper end.

Figure 32:
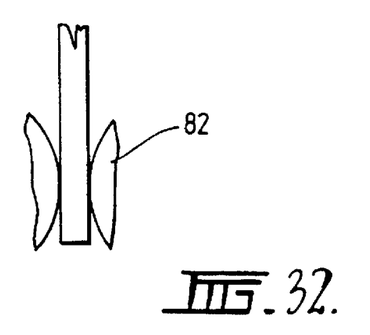

FIG. 32 shows spigots with convex shaped fins 82.

Figure 33:
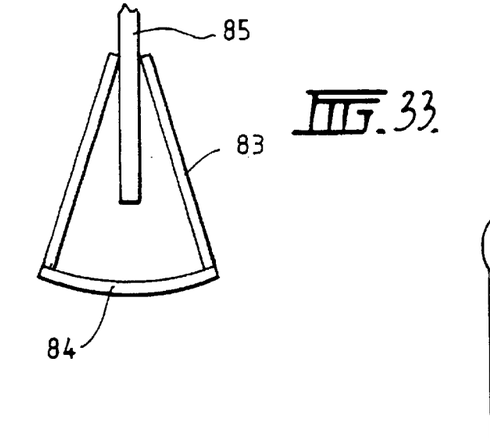

FIG. 33 shows spigots which are located on a concave base section 84 and are thin elements which converge towards each other at their upper ends to grip an object 85 therebetween.

Figure 34:
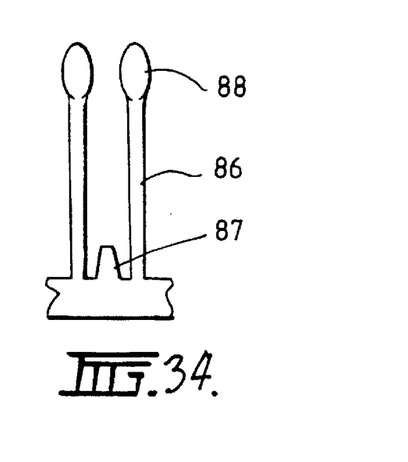

FIG. 34 shows spigots 86 which have a flexible ridge 87 located therebetween so as to allow an object to be inserted between a spigot and the ridge 87 at its lower end but at the same time allow the object to be gripped by bulbous head portions 88 of each spigot at an upper end of the object.

Figure 35:
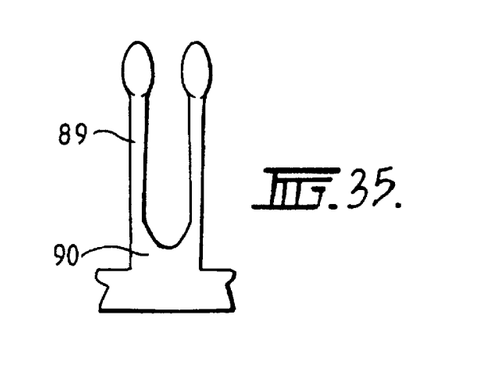

FIG. 35 shows spigots 89 with a webbing 90 therebetween which is adapted to be extremely pliable in order to receive an end of an object therein.

Figure 36:
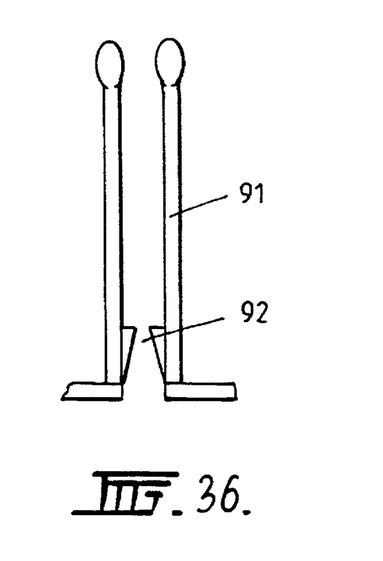
Figure 37:
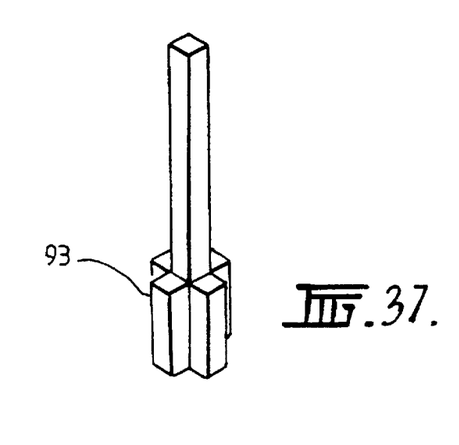

FIG. 36 shows wedge like fins 91 located at the lower end of each spigot 92 whereas FIG. 37 shows a cross configuration of straight sided fins 93.

The shape of peripheral fins of the spigots may vary dependent upon the type of article which is to be gripped/stored by the storage device or the amount of gripping force which is to be applied to the article. In addition the peripheral surface of each fin may be of increased width in order to increase the surface area of contact with an object to be gripped.

Other variations may be made to the storage devices described above without departing from the overall inventive concept.

What is claimed is:

1. A device for retaining articles comprising:
   a generally planar support surface having a plurality of adjacent holding means that comprise resiliently deformable holding members which extend from the support surface, wherein each holding member has at least one holding portion comprising at least one fin extending from a side wall thereof; and
   at least one holding zone defined by a space between adjacent holding means and wherein the device has a plurality of orientations in which the adjacent holding means are adapted to immobilize at least one article in the holding zone irrespective of the device's orientation.

2. The device as claimed in claim 1 wherein each fin comprises a flexible web.

3. The device as claimed in claim 2 wherein each fin increases in lateral width from a top end to a bottom end of its holding member.

4. The device as claimed in claim 3 wherein at least some of adjacent holding members have a hole located in the holding zone located therebetween.

5. The device as claimed in claim 4 wherein the holding zone comprises a plurality of holes aligned in rows between adjacent rows of holding members.

6. The device as claimed in claim 5 wherein the support surface comprises a lattice portion comprising rows and columns of holes and holding members.

7. The device as claimed in claim 6 wherein rows and columns or holding members are supported by rows and columns of base portions of the support surface.

8. The device as claimed in claim 7 wherein each holding member is located over one or the rows or columns of the base portions.

9. The device as claimed in claim 8 wherein each holding member is located at a junction between rows and columns of the base portions.

10. The device as claimed in claim 9 wherein holding members are arranged at respective junctions in rows and columns.

11. The device as claimed in claim 10 wherein holding portions of the holding members extend laterally across part of an adjacent hole.

12. The device as claimed in claim 1 wherein each holding member includes a plurality of fins.

13. The device as claimed in claim 12 wherein the fins comprise gripping means for gripping an article between adjacent fins.

14. The device as claimed in claim 13 wherein each fin is spaced apart from the support surface.

15. The device as claimed in claim 14 wherein the support surface includes an adhesive backing whereby the support surface is able to be adhesively connected to another surface.

16. A device for retaining articles including a support surface having a plurality of adjacent holding means and at least one holding zone defined by a space between adjacent holding means and wherein the device is able to be placed in a plurality of orientations in which the adjacent holding means are adapted to hold at least one article in the holding zone, wherein each adjacent holding means comprises a boss made of soft pliable material having a hole therein configured to be disposed around at least a portion of the holding means, wherein said boss acts as a base sleeve having a plurality of sleeve members each located around a respective boss that extend outwardly from said holding means and which are adapted to provide a frictional engagement with an article between adjacent holding means.

17. A device for retaining articles including a support surface having a plurality of adjacent holding means and at least one holding zone defined by a space between adjacent holding means and wherein the device is able to be placed in a plurality of orientations in which the adjacent holding means are adapted to hold at least one article in the holding zone, wherein the holding means comprises base holding members and cover holding members, wherein the base holding members fit around the holding means adjacent the support surface and the cover holding members are disposed away from the support surface at an opposite end of the holding means, wherein the cover holding members are constructed of a more deformable material than the base holding members to enable the cover holding members to deform into the holding zone and provide frictional engagement with an article inserted within the holding zone.

18. The device as claimed in claim 1, wherein the support surface includes a coupling portion for coupling the device with a structure surface, whereby the device is immobilized with respect to the structure surface.

19. The device as claimed in claim 1 wherein each holding member has a geometrical shape.

20. The device as claimed in claim 19 wherein the shape is triangular.

21. The device as claimed in claim 1 wherein the holding members have a hollow interior.

22. The device as claimed in claim 1 wherein each holding member comprises an upwardly extending wall.

23. The device as claimed in claim 22 wherein the holding zone comprises a slot between the walls of adjacent holding members.

24. The device as claimed in claim 23 wherein the slots have different lengths.

25. The device as claimed in claim 1 wherein the support surface is curved.

26. The device as claimed in claim 1 wherein the holding members have different lengths.

27. The device as claimed in claim 17 wherein the support surface is flexible.

28. The device as claimed in claim 16 wherein the holding members have bulbous and end portions.

29. The device as claimed in claim 1 wherein each holding member reduces in cross-sectional width from bottom to top.

30. The device as claimed in claim 1 wherein holding members are angled towards adjacent holding members.

31. A device for retaining articles comprising:
   a support surface having a plurality of adjacent holding members which extend from the support surface;
   a plurality of holding zones defined by spaces between adjacent holding members; and
   a cover member that covers the holding members and has a plurality of holding portions, wherein the holding portions are constructed of a more deformable material than the holding members to enable the holding portions to deform and provide frictional engagement with an article inserted within the holding zone and to hold said article in the holding zone, and wherein the device has a plurality of orientations in which the adjacent holding members are adapted to immobilize at least one article in the holding zone irrespective of the device's orientation.

32. The device as claimed in claim 31 wherein the cover member is a coating of flexible material formed over the holding members.

33. The device as claimed in claim 31 wherein the holding portions comprise at least one fin extending from a side wall thereof.

34. The device as claimed in claim 31 wherein the cover member fits over a free end of the holding members and is constructed of a deformable material that deforms into the holding zone and provides frictional engagement with an article inserted within the holding zone.

* * * * *